(12) United States Patent
Kovalan et al.

(10) Patent No.: US 9,454,418 B1
(45) Date of Patent: Sep. 27, 2016

(54) METHOD FOR TESTING CAPABILITY OF DISSIMILAR PROCESSORS TO ACHIEVE IDENTICAL COMPUTATIONS

(71) Applicants: Mark A. Kovalan, Cedar Rapids, IA (US); Mark Clifford Singer, Cedar Rapids, IA (US)

(72) Inventors: Mark A. Kovalan, Cedar Rapids, IA (US); Mark Clifford Singer, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 161 days.

(21) Appl. No.: 14/465,077

(22) Filed: Aug. 21, 2014

(51) Int. Cl.
*G06F 11/07* (2006.01)

(52) U.S. Cl.
CPC .................. *G06F 11/0724* (2013.01)

(58) Field of Classification Search
CPC ........... G06F 11/1641; G06F 11/1637; G06F 11/1645; G06F 11/1633
See application file for complete search history.

(56) References Cited

U.S. PATENT DOCUMENTS

| 7,852,235 B1 | 12/2010 | Johnson et al. | |
|---|---|---|---|
| 8,015,390 B1 | 9/2011 | Corcoran et al. | |
| 2012/0030519 A1* | 2/2012 | Wilt | G06F 11/1637 714/43 |
| 2014/0317419 A1* | 10/2014 | Cooke | G06F 12/1408 713/193 |

* cited by examiner

*Primary Examiner* — Jigar Patel
(74) *Attorney, Agent, or Firm* — Edmonds & Nolte, PC

(57) ABSTRACT

A method for testing processors includes generating, from a set of input bits, a first set of machine data bits in a first processor and a second set of machine data bits in a second processor dissimilar to the first processor, and comparing the first and second sets of machine data bits to output a first comparison result. The method also includes generating, from a third set of machine data bits, a first and second sets of machine result bits, and comparing the first and second sets of machine result bits to output a second comparison result. The method further includes generating, from a fourth set of machine data bits, a first and second sets of output bits, and comparing the first and second sets of output bits to output a third comparison result. The method also includes determining whether the first and second processors operate substantially similar to each other based on at least one of the first, second, and third comparison results.

19 Claims, 3 Drawing Sheets

METHOD FOR TESTING CAPABILITY OF DISSIMILAR PROCESSORS TO ACHIEVE IDENTICAL COMPUTATIONS

BACKGROUND

High-integrity processing platforms, e.g., flight deck, auto flight platforms, or the like, typically employ cross-comparing of computation outputs from two or more processors in order to detect and/or mitigate random faults. For applications such as Fly-By-Wire (FBW), two or more dissimilar commercial-off-the-shelf (COTS) processors are generally used to compute independent outputs which may be cross-compared to detect potential common-mode errors and random faults. The cross-comparison may either be bit-for-bit or a threshold comparison that may allow for small differences in the computation outputs within certain predefined tolerance values. Bit-for-bit comparisons may avoid the need to allocate tolerance values that might inadvertently compromise system safety. Typically, it is assumed that if two similar COTS processors use bit-for-bit identical input data in their respective calculations, then their results will be bit-for-bit identical as well.

However, in applications such as fly-by-wire where dissimilar COTS processors are used, it may not be guaranteed that bit-for-bit identical results will be obtained from computations, due to round-off errors and/or design choices in the implementations of the COTS processors, despite the processors' being designed to follow conventional mathematical standards (e.g., IEEE floating point specification). Detailed processors design data that might be used to analytically identify potential differences and/or confirm identical results is generally not available, due to the design data being proprietary to the developers of the processors and/or the supporting software.

Although bit-for-bit comparisons (at the output level) are currently being incorporated in existing systems, customers and certification agencies (e.g., Federal Aviation Administration, Transport Canada, European Aviation Safety Agency) may question the viability of this approach where dissimilar processors are used. An area of concern is the ability of the processors to produce the same output at each processor based on identical inputs, due to different round-off or other processor design features. In the absence of detailed design data, analytical techniques are not available to assert identical results from each processor. Although it can be shown that identical inputs result in identical outputs from each processor for specific test cases, the number of test cases that can be executed in any practical time is a small fraction of the data combinations a processor may encounter in operation. Without a means to define and execute a test suite (e.g., processing test inputs to obtain outputs) and, thereby, confirm the capability of the processors, customers and certification agencies may not confident of the product.

What is needed, then, is a method for testing two or more dissimilar processors in order to confirm that, given the same inputs at the same time, the two or more dissimilar processors produce the same outputs with a level of certainty that is shown to be commensurate with the expectations of the system in which the dissimilar processors are used.

SUMMARY

Example embodiments may be directed to a method of testing processors. The method may include generating, from a set of input bits, a first set of machine data bits in a first processor and a second set of machine data bits in a second processor dissimilar to the first processor, and comparing the first set of machine data bits with the second set of machine data bits to output a first comparison result. Further, the method may include generating, from a third set of machine data bits, a first set of machine result bits in the first processor and a second set of machine result bits in the second processor, and comparing the first set of machine result bits with the second set of machine result bits to output a second comparison result. Still further, the method may include generating, from a fourth set of machine data bits, a first set of output bits in the first processor and a second set of output bits in the second processor, and comparing the first set of output bits with the second set of output bits to output a third comparison result. Additionally, the method may include determining whether the first processor and the second processor operate substantially similar to each other based on at least one of the first, second, and third comparison results.

Example embodiments may be directed to a computer-program product for testing processors. The computer-program product may include a non-transitory computer-readable medium having instructions stored thereon. The instructions may be executed by a computer and may cause the computer to generate, from a set of input bits, a first set of machine data bits in a first processor and a second set of machine data bits in a second processor dissimilar to the first processor, and compare the first set of machine data bits with the second set of machine data bits to output a first comparison result. The instructions may also cause the computer to generate, from a third set of machine data bits, a first set of machine result bits in the first processor and a second set of machine result bits in the second processor, and compare the first set of machine result bits with the second set of machine result bits to output a second comparison result. Further, the instructions may cause the computer to generate, from a fourth set of machine data bits, a first set of output bits in the first processor and a second set of output bits in the second processor, and compare the first set of output bits with the second set of output bits to output a third comparison result. Additionally, the instruction may cause the computer to determine whether the first processor and the second processor operate substantially similar to each other based on at least one of the first, second, and third comparison results.

Example embodiments may be directed to a method for testing processors. The method may include generating, from a set of input bits, a first set of machine data bits in a first processor and a second set of machine data bits in a second processor dissimilar to the first processor, comparing the first set of machine data bits with the second set of machine data bits, and outputting a result of the comparison between the first set of machine data bits and the second set of machine data bits. The result may indicate whether the first processor and the second processor are each configured to generate the respective sets of machine data bits that are substantially identical to each other. The method may also include generating, from a set of third machine data bits, a first set of machine result bits in the first processor and a second set of machine result bits in the second processor, comparing the first set of machine result bits with the second set of machine result bits, and outputting a result of the comparison between the first set of machine result bits and the second set of machine result bits. The result may indicate whether the first processor and the second processor are each configured to generate the respective sets of machine result bits that are substantially identical to each other. The method may further include generating, from a fourth set of machine data bits, a first set of output bits in the first processor and a second set of output bits in the second processor, comparing the first set of output bits with the second set of output bits, and outputting a result of the comparison between the first set of output bits and the second set of output bits. The result may indicate whether the first processor and the second processor are each configured to generate the respective sets of output bits that are substantially identical to each other.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION OF EXEMPLARY EMBODIMENTS

Figure 1:
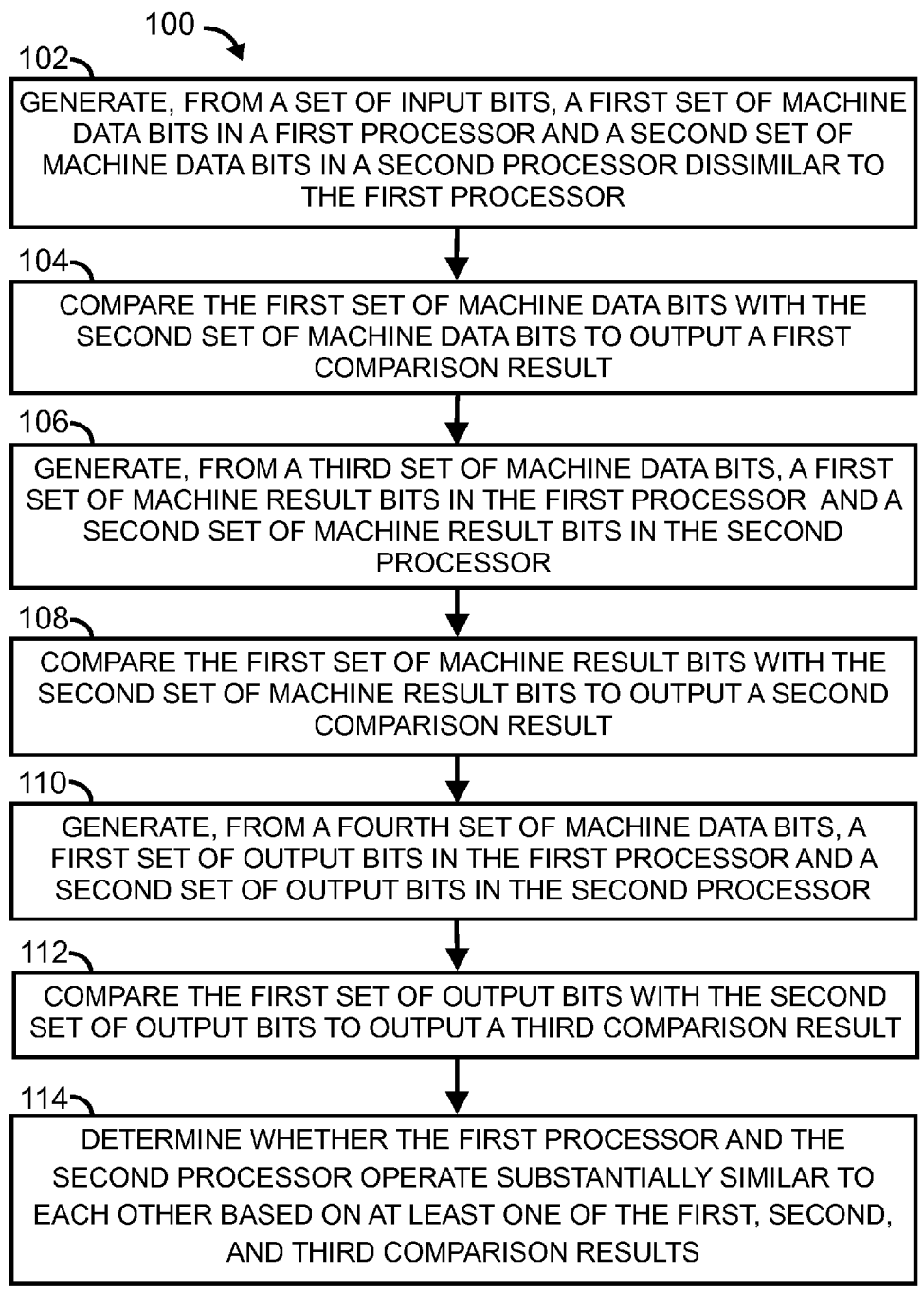
FIG. 1 illustrates a flowchart of a method for testing processors, according to example embodiments.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Example embodiments disclosed are directed to testing two or more dissimilar commercial-off-the-shelf (COTS) processors. For ease of explanation, example embodiments discussed below are directed to testing of two dissimilar processors. However, it will be understood that more than two dissimilar processors may also be tested based on the example embodiments discussed below. According to example embodiments, the processors may be dissimilar in various ways including but not limited to the two processors running at different clock speeds, or having different processor architectures. It should also be noted that, although the two processors may be dissimilar with regards to physical characteristics such as design, construction, operation and the like, example embodiments disclosed below are fully applicable to systems wherein processor dissimilarity may be non-physical in nature. For example, dissimilarity may be due to a difference in the manner in which the processors manipulate (e.g., encode and/or encrypt) data. Also, processor dissimilarity may be incidentally introduced in a system at a later stage as a result of, e.g., processor design update. It should also be noted that, although the two processors are dissimilar as noted above, the two processors may be designed to follow conventional mathematical standards of operation (e.g., IEEE floating point specification) and may thus be considered to operate similar to each other.

Based on the methods disclosed herein, it may be possible to ascertain that the respective outputs from two dissimilar processors may be the same when the two dissimilar processors perform the same operation on the same inputs provided at substantially at the same time. It should be noted that "substantially at the same time" may be used to express substantially close in time such that other steps are not taken between the time of the two steps being carried out. Because the input lanes (or buses) are synchronous, the operations in each respective lane may not be precisely coupled. Rather, the same event in each lane may happen somewhere within a small time interval. By design, the hardware may guarantee that both events (one in each lane) may take place before the next hardware/software event may occur thus accomplishing the synchronization of both incoming and outgoing data.

In order to simplify calculations and design of the testing circuitry, it may be assumed that, for similar inputs provided at substantially the same time, the respective outputs from the two dissimilar processors are identical when the rate at which any differences (also referred to as errors) in the outputs occur is low. Stated differently, it may be assumed that the respective outputs from the two dissimilar processors are identical when the probability of an occurrence of an error in the outputs is low. For example, an industry accepted probability of an error occurring at the outputs of the two dissimilar processors may be around 1E-7/hr, which may translate to one instance of dissimilar outputs occurring every 10 million hours of operation. Similarly, the random failure rate for a system employing two cross-compared processors may be around 1E-5/hr. For the test method disclosed herein, the acceptable error probability may be assumed to be around the above mentioned rates or may be budgeted at around 10% of the above rates, e.g., ranging from 1E-5/hr to 1E-8/hr, depending on how the processors are used in the system.

The testing methods disclosed herein are based on the processors operating on floating point numbers; however, it will be understood that operations based on other number formats are also within the scope of the disclosure. In aircraft applications, the precision of the floating point numbers may generally be greater than that of the inputs to and/or the outputs from the two processors. For example, the precision of the floating point numbers may be 53 bits and the precision of the inputs and/or outputs may range from 16 bits to 20 bits.

According to example embodiments disclosed herein, testing may include providing, as test inputs, all possible input combinations to each of the two dissimilar processors at substantially the same time and checking whether the inputs are correctly converted into higher precision machine data bits by the two processors. For instance, assuming a 20 bit input, all 2^20 combinations of the input bits are provided at the same time to both the processors. The 20 bit inputs may be converted into 53 bit precision machine data (also referred to as machine data bits) in each of the two processors. The machine data bits from one processor may be compared bit-for-bit with the machine data bits from the other processor. In an example embodiment, the 53 bit machine input data may be read from each processor using external testing circuitry. The external testing circuitry may also include one or more comparators configured to compare the machine data bits from the two processors bit-for-bit. It will be understood that exhaustive testing (e.g., varying the input bits such that all possible input bit combinations may be provided) of the input bits may be possible since it may be carried out in a relatively small amount of time. For example, assuming that each input bit combination (also referred to as an input bit set) is provided every 100 µs to each processor, it would take around 2 minutes to compare all 2^20 bit combinations (or 2^20 input bit sets). The comparison of the 53 bit machine data bits may indicate whether the inputs have been correctly converted into the respective 53 machine data bits by each processor.

According to example embodiments, testing may include externally providing, as test inputs, 53 machine data bits to each of the two dissimilar processors. The 53 machine data bits may be represented in the floating point format and may be pseudo-randomly generated. In an example embodiment, the 53 machine data bits may be provided to the processors using a separate set of test input pins on the processors. The pseudo-random test inputs may be representative of the inputs provided to the processors during operation. An adequate number of cases may be used to conclude with a degree of confidence that, based on the pseudo-random test inputs to both processors, the outputs from both processors indicate identical computations with a sufficiently low error occurrence.

Each processor may perform one or more mathematical operations on the 53 machine data bits provided thereto. It should be noted that, at a time, similar mathematical operations may be performed by the processors for each set of input machine data bits. The types of mathematical operations that may be performed by the processors may be determined based on the intended application of the flight system employing the processors. For example, processors that may be used in the Engine Indication and Crew Alerting System (EICAS) may be subjected to perform mathematical operations that may be encountered by the EICAS during flight operations. Similarly, processors that may be used in the Autopilot system may perform mathematical operations different from the processors of the EICAS and, during testing, the Autopilot system processors may be subjected to perform different mathematical operations on the input machine data bits. It should further be noted that supporting math libraries, compilers, and the like that may be needed to perform the mathematical operations may be made available during testing.

The 53 machine data bits may be processed into machine result bits, by each of the two dissimilar processors. The machine result bits may have a 53 bit precision similar to the machine data bits. The 53 machine result bits from the two processors may be compared to determine whether the two processors performing the same mathematical operations on the same 53 machine data bits produced the same 53 machine result bits.

Generally, any differences between the two 53 machine result bits may be observed in the Least Significant Bit (LSB) positions of the 53 machine result bits, e.g., reflecting round-off and/or design decisions. Further, these differences in the LSB may affect the system only if the differences in the LSB in the 53 machine result bits are eventually translated into differences in the LSB of the 20 bit processor output. Accordingly, the cases in which differences are observed in the LSB of the 53 machine result bits but not in the 20 bit processor output may be ignored. The probability of an occurrence of an error in the LSB in the 53 machine result bits being translated into a difference in the LSB of the relatively less granular 20 bit processor output may be calculated as follows. For example, in a system including 20 bit processor outputs from 53 machine result bits, a difference in an LSB of the 53 machine result bits may have a $(1/2^{53})/(1/2^{20})=1.1\text{E}-10$ chance of causing a difference in an LSB of the 20 bit processor outputs. If one such difference in the LSB is observed per hour of testing, this may suggest a 1E-10/hr probability (once in over a billion hours of system operation) of a difference in normal system operation, which may be two orders of magnitude better than the most stringent 1E-8/hr budget noted above. It may be noted that for a system including 16 bit processor outputs, an even smaller chance of causing a difference in the LSB of the 20 bit processor outputs may be observed.

Some aircraft control systems (e.g., autopilot systems) generally operate in a closed-loop control system and operate to minimize the error at the output. For example, the autopilot system may minimize any deviation of the aircraft from a set speed and direction. As such, the input data provided to the processors of the autopilot system may be assumed to be centered around zero. Accordingly, in addition to the pseudo-random testing described above, example embodiments may also include supplemental testing, where the inputs (20 bit input data and/or the 53 bit machine data bits) are first provided as close to zero as possible and reduced (e.g., by dividing the previous inputs by 2) in each subsequent iteration until the inputs reach zero or the smallest input value possible in the system.

According to example embodiments, in order to test the processor outputs, each processor may be provided, as test inputs, 53 machine data bits which may be converted into 20 bit outputs. The 53 machine data bits may correspond to the 20 bit output desired to be observed at the processor output. For example, if all "ones" are desired in the 20 bit output, then a machine data bit set including the corresponding 53 machine data bits in the floating point format may be provided to the processors. In an example embodiment, in addition to providing 53 machine data bits corresponding to the desired 20 bit output, 53 machine data bits that are greater than the desired 20 bit output by one LSB bit are also provided. Similarly, in another example embodiment, 53 machine data bits that are less than the desired 20 bit output by one LSB bit are provided. In this manner, any conversion differences may be adequately detected. Further, it should be noted that testing of the processor outputs may be exhaustive in that all possible combinations of the 20 bit processor outputs may be tested by varying the corresponding machine data bits provided.

FIG. 1 illustrates a flowchart of a method 100 for testing processors, according to example embodiments. The method 100 may include generating, from a set of input bits, a first set of machine data bits in a first processor and a second set of machine data bits in a second processor dissimilar to the first processor, as at 102, and comparing the first set of machine data bits with the second set of machine data bits to output a first comparison result, as at 104. Further, the method 100 may include generating, from a third set of machine data bits, a first set of machine result bits in the first processor and a second set of machine result bits in the second processor, as at 106, and comparing the first set of machine result bits with the second set of machine result bits to output a second comparison result, as at 108. Still further, the method 100 may include generating, from a fourth set of machine data bits, a first set of output bits in the first processor and a second set of output bits in the second processor, as at 110, and comparing the first set of output bits with the second set of output bits to output a third comparison result, as at 112. Additionally, the method 100 may include determining whether the first processor and the second processor operate substantially similar to each other based on at least one of the first, second, and third comparison results, as at 114.

Figure 2A:
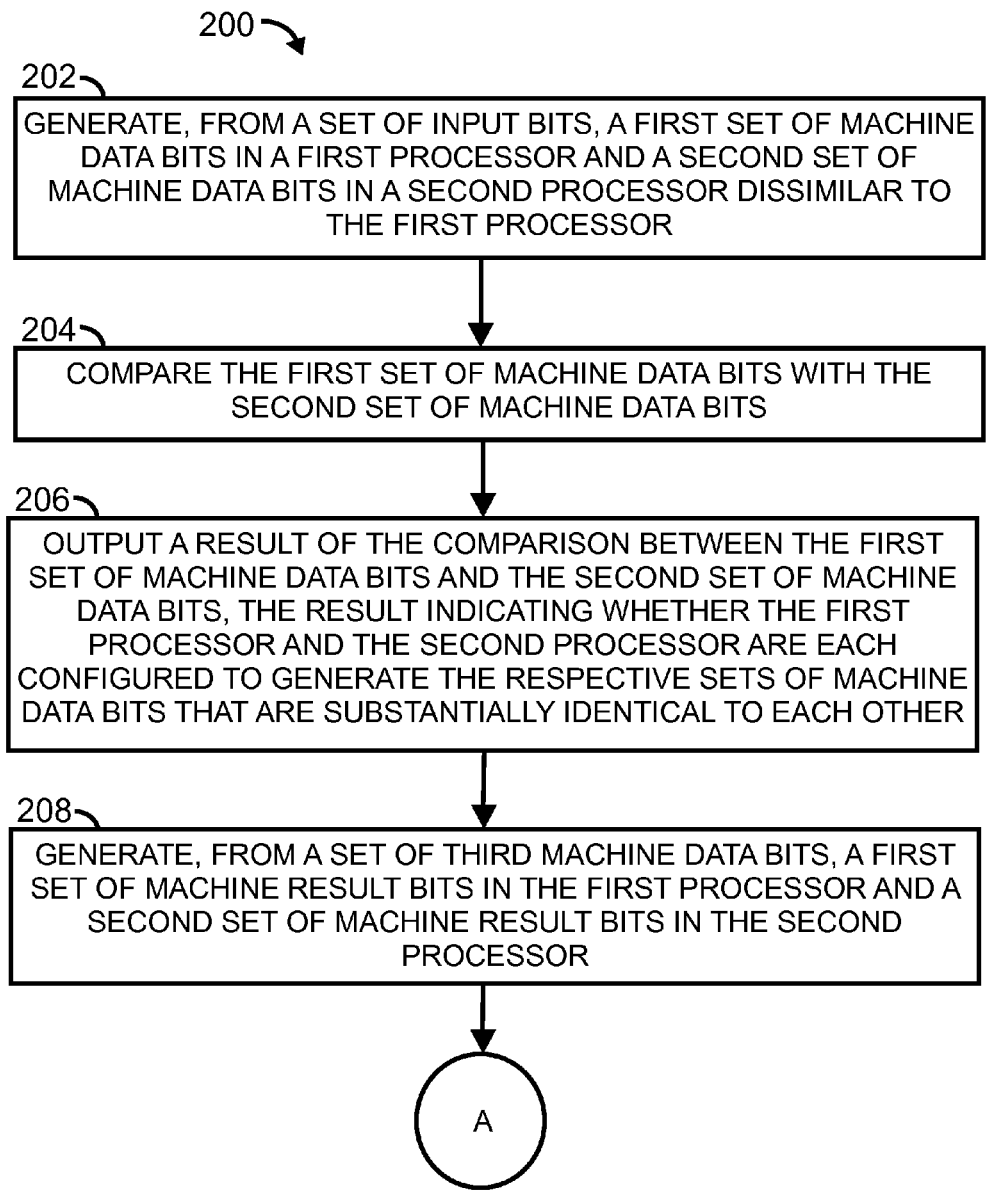
FIGS. 2A and 2B illustrate a flowchart of a method for testing processors, according to example embodiments.
Figure 2B:
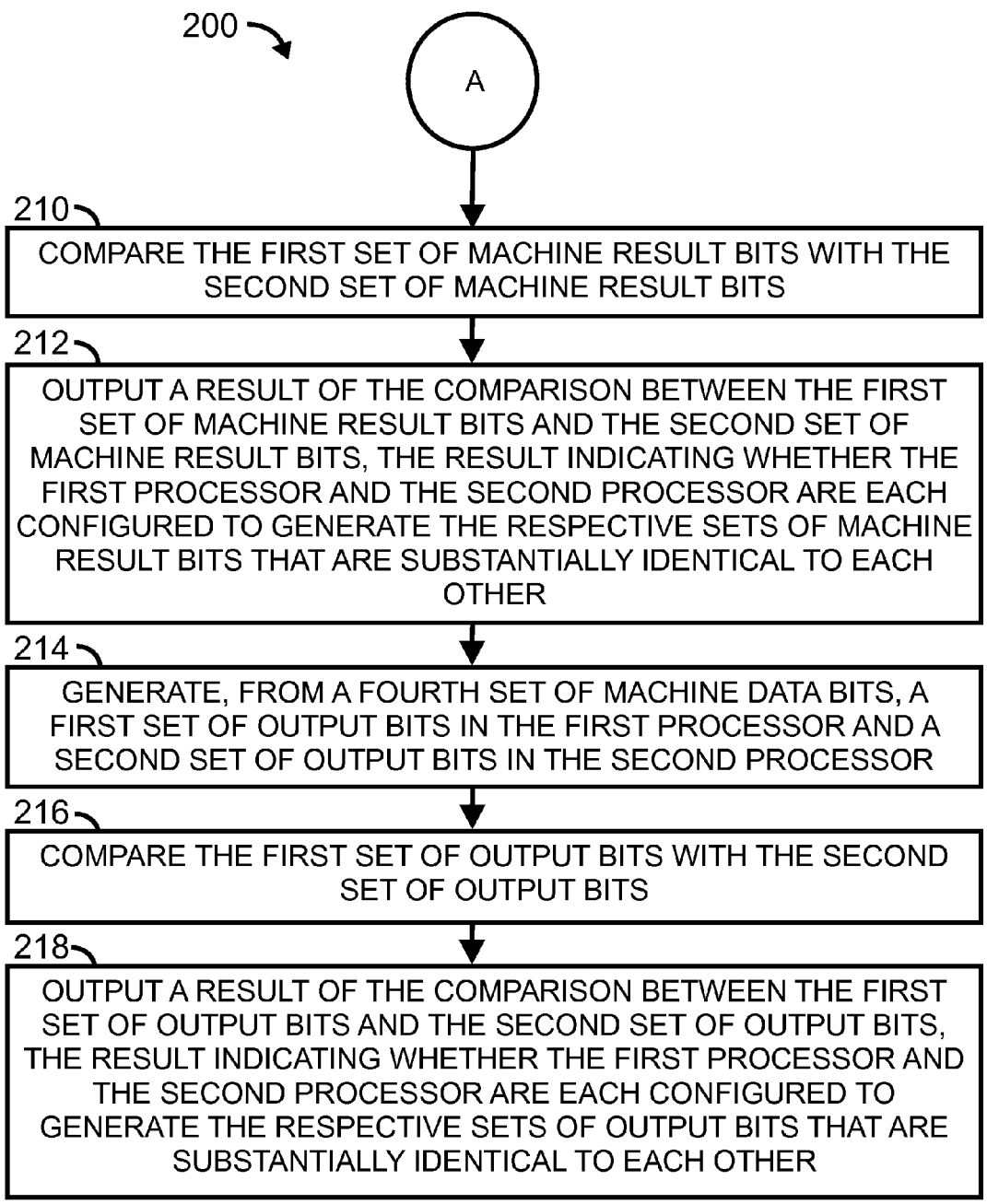

FIGS. 2A and 2B illustrate a flowchart of a method 200 for testing processors, according to example embodiments. The method 200 may include generating, from a set of input bits, a first set of machine data bits in a first processor and a second set of machine data bits in a second processor dissimilar to the first processor, as at 202, comparing the first set of machine data bits with the second set of machine data bits, as at 204, and outputting a result of the comparison between the first set of machine data bits and the second set of machine data bits, as at 206. The result may indicate whether the first processor and the second processor are each configured to generate the respective sets of machine data bits that are substantially identical to each other. The method 200 may further include generating, from a set of third machine data bits, a first set of machine result bits in the first processor and a second set of machine result bits in the second processor, as at 208, comparing the first set of machine result bits with the second set of machine result bits, as at 210, and outputting a result of the comparison between the first set of machine result bits and the second set of machine result bits, as at 212. The result may indicate whether the first processor and the second processor are each configured to generate the respective sets of machine result bits that are substantially identical to each other. Additionally, the method 200 may include generating, from a fourth set of machine data bits, a first set of output bits in the first processor and a second set of output bits in the second processor, as at 214, comparing the first set of output bits with the second set of output bits, as at 216, and outputting a result of the comparison between the first set of output bits and the second set of output bits, as at 218. The result may indicate whether the first processor and the second processor are each configured to generate the respective sets of output bits that are substantially identical to each other.

According to example embodiments, the above disclosed testing methods may be performed using a testing device that may provide the test inputs to the processors being tested. The test device may be externally coupled to the system including the processors to be tested or the test device may be a part of the system including the processors to be tested. The outputs resulting from the test inputs may be analyzed (e.g., compared) using hardware and/or software on board or external to the test device. For instance, the outputs may be provided to a comparator circuit that may indicate whether the outputs from the processors under test are similar to each other. Alternatively or additionally, one or more software applications may determine whether the outputs from the processors under test are similar to each other.

According to example embodiments, in case the inputs and/or outputs of the processors to be tested are substantially large, e.g., 53 bit precision, exhaustive testing may not be practical and pseudo-random testing may be used to generate the test inputs. Herein, the number of pseudo-random test cases may be commensurate with a sufficiently low error occurrence for the system at hand. It should be noted that, for either exhaustive or pseudo-random testing, the results may be analyzed to show that the system requirements are met.

The testing according to example embodiments disclosed above may be used to test avionics systems, e.g., closed-loop control, display systems, etc. Such systems may generally not stress the dynamic range of floating point math operations, since these systems have previously been implemented on fixed-point machines of 16 or 32 bits. However, it should be noted that, although the testing according to example embodiments disclosed above may be used to test avionics systems, e.g., closed-loop control, display systems, the disclosed test methods are not limited thereto.

Example embodiments may also be directed to a computer-program product for testing two dissimilar processors. The computer-program product may include one or more instructions stored on a non-transitory computer-readable medium and executable by one or more processors of a computer on which the computer-program product is run. A computer-readable media may be any available media that may be accessed by a computer. By way of example, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, when the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A method for testing processors, the method comprising:
   generating, from a set of input bits, a first set of machine data bits in a first processor and a second set of machine data bits in a second processor dissimilar to the first processor;
   comparing the first set of machine data bits with the second set of machine data bits to output a first comparison result;
   generating, from a third set of machine data bits, a first set of machine result bits in the first processor and a second set of machine result bits in the second processor;
   comparing the first set of machine result bits with the second set of machine result bits to output a second comparison result;
   generating, from a fourth set of machine data bits, a first set of output bits in the first processor and a second set of output bits in the second processor;
   comparing the first set of output bits with the second set of output bits to output a third comparison result; and
   determining whether the first processor and the second processor operate substantially similar to each other based on at least one of the first, second, and third comparison results, wherein each of the set of input bits, the first set of output bits, and the second set of output bits has fewer bits than each of the first set of machine data bits, the second set of machine data bits, the first set of machine result bits, and the second set of machine result bits.

2. The method of claim 1, wherein a number of bits in each of the set of input bits, the first set of output bits, and the second set of output bits ranges from 16 bits to 20 bits.

3. The method of claim 1, wherein the machine result bits of the first set and the second set and the machine data bits of the first set, the second set, third set, and the fourth set are each represented in a floating point format.

4. The method of claim 1, wherein generating the first set of machine result bits and the second set of machine result bits comprises performing an identical mathematical operation on the third set of machine data bits in each of the first processor and the second processor.

5. The method of claim 1, further comprising:
   pseudo-randomly generating the machine data bits of the third set of machine data bits.

6. The method of claim 1, further comprising:
   generating the first and second sets of output bits from a fifth set of machine data bits, the fifth set of machine data bits differing from the fourth set of machine data bits in the Least Significant Bit position.

7. The method of claim 6, wherein the fifth set of machine data bits represents a value that is greater than a value represented by the fourth set of machine data bits by one Least Significant Bit.

8. The method of claim 6, wherein the fifth set of machine data bits represents a value that is less than a value represented by the fourth set of machine data bits by one Least Significant Bit.

9. The method of claim 1, further comprising:
   varying the input bits of the set of input bits such that all combinations of the input bits are provided to each processor.

10. The method of claim 1, further comprising:
    varying the machine data bits of the fourth set of machine data bits such that all combinations of the output bits of the first and second set are generated from the respective processors.

11. A computer-program product for testing processors, the computer-program product embodied in a non-transitory computer-readable storage medium having instructions stored thereon and which when executed on a computer cause the computer to:
    generate, from a set of input bits, a first set of machine data bits in a first processor and a second set of machine data bits in a second processor dissimilar to the first processor;
    compare the first set of machine data bits with the second set of machine data bits to output a first comparison result;
    generate, from a third set of machine data bits, a first set of machine result bits in the first processor and a second set of machine result bits in the second processor;
    compare the first set of machine result bits with the second set of machine result bits to output a second comparison result;
    generate, from a fourth set of machine data bits, a first set of output bits in the first processor and a second set of output bits in the second processor;
    compare the first set of output bits with the second set of output bits to output a third comparison result; and
    determine whether the first processor and the second processor operate substantially similar to each other based on at least one of the first, second, and third comparison results, wherein each of the set of input bits, the first set of output bits, and the second set of output bits has fewer bits than each of the first set of machine data bits, the second set of machine data bits, the first set of machine result bits, and the second set of machine result bits.

12. The computer-program product of claim 11, wherein the instructions further cause the computer to generate the first set of machine result bits and the second set of machine bits by performing an identical operation on the third set of machine data bits in each of the first processor and the second processor.

13. The computer-program product of claim 11, wherein the instructions further cause the computer to pseudo-randomly generate the machine data bits of the third set of machine data bits.

14. The computer-program product of claim 11, wherein the instructions further cause the computer to generate the first and second sets of output bits from a fifth set of machine data bits, the fifth set of machine data bits differing from the fourth set of machine data bits in the Least Significant Bit position.

15. A method for testing processors, the method comprising:
    generating, from a set of input bits, a first set of machine data bits in a first processor and a second set of machine data bits in a second processor dissimilar to the first processor;
    comparing the first set of machine data bits with the second set of machine data bits;
    outputting a result of the comparison between the first set of machine data bits and the second set of machine data bits, the result indicating whether the first processor and the second processor are each configured to generate the respective sets of machine data bits that are substantially identical to each other;

generating, from a set of third machine data bits, a first set of machine result bits in the first processor and a second set of machine result bits in the second processor;

comparing the first set of machine result bits with the second set of machine result bits;

outputting a result of the comparison between the first set of machine result bits and the second set of machine result bits, the result indicating whether the first processor and the second processor are each configured to generate the respective sets of machine result bits that are substantially identical to each other;

generating, from a fourth set of machine data bits, a first set of output bits in the first processor and a second set of output bits in the second processor;

comparing the first set of output bits with the second set of output bits; and outputting a result of the comparison between the first set of output bits and the second set of output bits, the result indicating whether the first processor and the second processor are each configured to generate the respective sets of output bits that are substantially identical to each other, wherein each of the set of input bits, the first set of output bits, and the second set of output bits has fewer bits than each of the first set of machine data bits, the second set of machine data bits, the first set of machine result bits, and the second set of machine result bits.

16. The method of claim 15, further comprising:
calculating a probability of an occurrence of an error in the generation of the first and second sets of machine result bits from the third set of machine data bits, the error indicative of the first and second sets of machine result bits representing a different value than the third set of machine data bits.

17. The method of claim 15, wherein generating the first and second sets of machine result bits comprises performing an identical mathematical operation on the third set of machine data bits in each of the first and second processors.

18. The method of claim 15, further comprising:
pseudo-randomly generating the machine data bits of the third set of machine data bits.

19. The method of claim 15, further comprising:
generating the first and second sets of output bits from a fifth set of machine data bits, the fifth set of machine data bits differing from the fourth set of machine data bits in the Least Significant Bit position.

* * * * *